Figure 1:
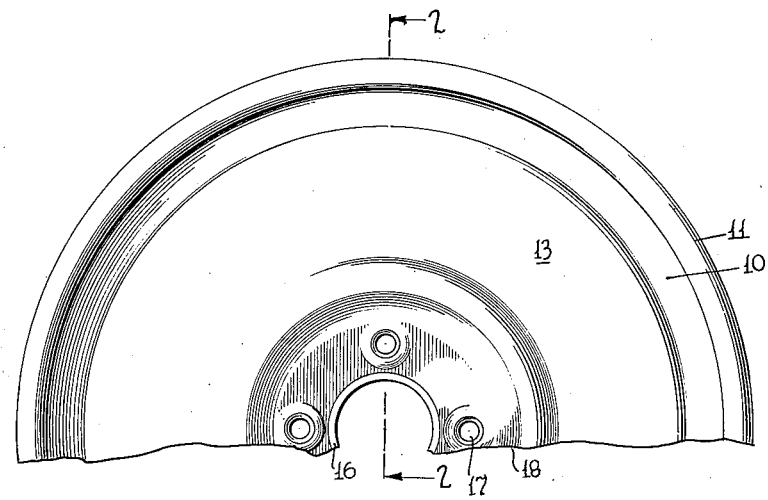

Aug. 17, 1937.   C. L. EKSERGIAN   2,090,254
DISK WHEEL
Filed Aug. 16, 1935

INVENTOR.
CAROLUS L. EKSERGIAN
BY
ATTORNEY.

Patented Aug. 17, 1937

2,090,254

UNITED STATES PATENT OFFICE 2,090,254

DISK WHEEL

Carolus L. Eksergian, Detroit, Mich., assignor to Budd Wheel Company, Philadelphia, Pa., a corporation of Pennsylvania Application August 16, 1935, Serial No. 36,531

2 Claims. (Cl. 301—63)

This invention relates generally to vehicle wheels. More particularly, it relates to disk wheels in which a single sheet metal disk interconnects the hub and rim members.

It is a general object of the present invention to provide a disk for wheels of this type, which will have a much greater resistance to fatigue than disks heretofore known and which will yet be simple in construction, and attractive in appearance.

Another object of the invention consists in the provision of a wheel of this general type which will be relatively light in weight in proportion to its strength and which will also be attractive in appearance.

The invention contemplates the provision of an annular rib or axially extending channel formed in the disk adjacent the bolting on flange of the disk, thus providing a relatively localized area for resiliently absorbing the stresses to which the wheel is subjected during use.

This rib serves to accentuate the angle between the disk body and the hub portion of the disk and creates an annular resilient area closely adjacent the area in which the wheel body is secured to the hub.

Other objects and advantages of the invention will become apparent from the following specification when considered in connection with the accompanying drawing.

Figure 2:
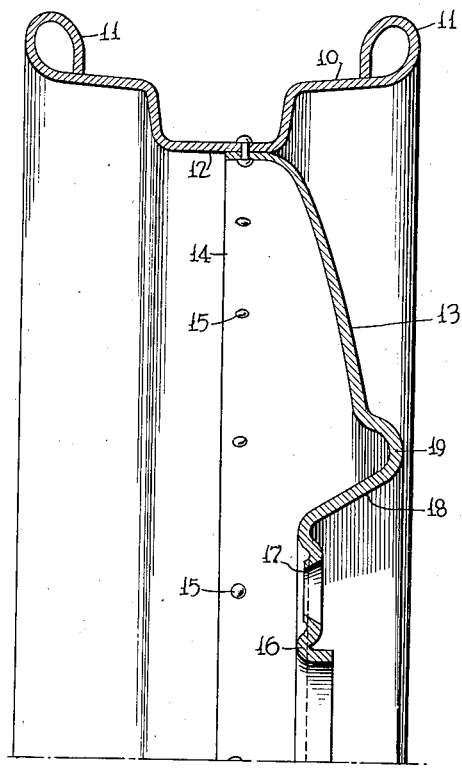

In the drawing:

Fig. 1 is a front elevation of a portion of a disk wheel embodying the invention; and Fig. 2 is a vertical sectional view taken on the line 2—2 of Figure 1 looking in the direction of the arrows.

With more particular reference to the drawing, the wheel shown comprises a sheet metal rim 10, of the drop center type having beaded flanges and a channel section, flat base, central portion 12. A disk 13 is provided preferably formed of sheet metal and having a body portion dished outwardly. The outer periphery of the disk is provided with an axially extending annular flange which is secured to the flat base 12 of the drop center rim 10 by means of an annular series of rivets 15.

The structure of the rim and the means of securement of the disk flange to the rim form no part of the present invention and many modifications of the specific embodiment illustrated in the drawing will be apparent to those skilled in the art.

The inner edge of the disk 13 is provided with bolting on flange 16 provided with a conventional series of apertures 17 providing seats for the nuts used in securing the wheel to the hub on which it is to be mounted.

Radially outwardly of the bolting on flange 17, the disk has a conical hub portion 18 which extends axially outwardly a sufficient distance to form one side of a channel like annular bead or groove 19. The opposite side of the groove 19, it will be seen, meets the body of the disk 13 at a relatively sharp angle, despite the fact that the wheel body is dished outwardly.

It will thus been seen that a relatively localized annular area is provided closely adjacent the hub of the wheel which serves to afford resiliency to radial as well as bending stresses.

It will be appreciated that this has been accomplished in a relatively simple construction. Modifications will be apparent to those skilled in the art.

I claim:

1. A vehicle wheel comprising a single stamping sheet metal body adapted to transmit the entire load between the rim and the hub, said body having a substantially radially extending bolting-on flange portion, a generally axially outwardly extending portion emanating from the radially outer extremity of said bolting-on flange, a generally conical portion extending radially outwardly and axially inwardly from the axially outer extremity of said axially extending portion to the rim, and an annular axially outwardly extending bead of a depth substantially greater than the thickness of the metal of the stamping interconnecting said last named portions, said bead having its side walls merging with the adjacent portions of the stamping and arranged with respect to at least one of said portions at a substantial angle thereto.

2. A vehicle wheel according to claim 1 in which the radially outer side wall of the bead is arranged at a substantial angle with the generally conical radially outer portion of the wheel body.

CAROLUS L. EKSERGIAN.